(12) United States Patent
Logan

(10) Patent No.: US 8,011,292 B1
(45) Date of Patent: Sep. 6, 2011

(54) INSULATED COOKING UTENSIL

(75) Inventor: Eugene T. Logan, Salina, KS (US)

(73) Assignee: Sigma Industries, Inc., Salina, KS (US)

( * ) Notice: Subject to any disclaimer, the term of this patent is extended or adjusted under 35 U.S.C. 154(b) by 1136 days.

(21) Appl. No.: 11/335,020

(22) Filed: Jan. 18, 2006

(51) Int. Cl.
*A47J 37/10* (2006.01)

(52) U.S. Cl. ....... 99/422; 99/447; 126/390.1; 220/573.2

(58) Field of Classification Search ............ 99/422, 99/447, 426, 403, 428, 42 Z; 220/573.2, 220/912
See application file for complete search history.

(56) References Cited

U.S. PATENT DOCUMENTS

| | | |
|---|---|---|
| 1,900,290 A | 3/1933 | Kudo |
| 2,057,951 A | 10/1936 | Ingram et al. |
| D106,782 S | 11/1937 | De Benque |
| 3,633,786 A | 1/1972 | Leedy |
| 3,640,209 A | 2/1972 | Wilson |
| 3,799,048 A * | 3/1974 | Finley .............. 99/415 |
| D253,332 S | 11/1979 | Rich |
| D258,711 S | 3/1981 | Baker et al. |
| D274,781 S | 7/1984 | Baker et al. |
| 4,489,852 A | 12/1984 | Logan et al. |
| 4,595,120 A * | 6/1986 | Logan et al. ........... 220/573.1 |
| D288,396 S | 2/1987 | Ritman |
| 4,941,585 A | 7/1990 | Hare et al. |
| D314,891 S | 2/1991 | Sata |
| 5,131,320 A * | 7/1992 | Jensen et al. ............. 99/422 |
| 5,351,608 A * | 10/1994 | Muchin et al. ............ 99/422 |
| 5,497,885 A | 3/1996 | Sussman |
| 5,655,805 A * | 8/1997 | Shaddy .................. 294/31.2 |
| 5,676,276 A | 10/1997 | Zielinski et al. |
| 5,800,853 A | 9/1998 | Wang |
| 5,806,410 A * | 9/1998 | Muchin et al. ............ 99/422 |
| D399,702 S | 10/1998 | Mishan |
| 5,921,173 A * | 7/1999 | Grycan et al. ............. 99/422 |

(Continued)

FOREIGN PATENT DOCUMENTS

GB 2072243 9/1997

(Continued)

OTHER PUBLICATIONS

Cushion Aire Gold Insulated Cookie Sheet, produpt packaging, Rema Bakeware Inc., Manitowoc, WI 54221.

*Primary Examiner* — Redinald L Alexander
(74) *Attorney, Agent, or Firm* — Jeffrey L. Thompson; Thompson & Thompson, P.A.

(57) ABSTRACT

An insulated cooking utensil has upper and lower substantially planar sheet members secured together with an air chamber interposed therebetween for insulating the upper sheet member from direct heat during cooking. Spaced detents are provided in the lower sheet member to support and maintain the upper and lower sheet members in a spaced relationship. The detents have dome-shaped configurations with relatively large dimensions and a flat spot at the peak to prevent deforming the upper sheet member locally where the detents contact the upper sheet member during use. The upper sheet member is made of aluminum and has a clear anodized coating on its upper surface. An angular disposed flange with an elongated thumbgrip extends along one side of the cooking utensil to facilitate gripping and handling. An expansion space between the outer edges of the sheet members accommodates a relatively greater expansion of the lower sheet member during cooking.

8 Claims, 4 Drawing Sheets

U.S. PATENT DOCUMENTS

| | | |
|---|---|---|
| D427,009 S | 6/2000 | Iyengar et al. |
| D431,958 S | 10/2000 | Harris |
| 6,279,469 B1 | 8/2001 | Bailey |
| 6,279,771 B1 | 8/2001 | Bryant |
| D464,846 S | 10/2002 | Black |
| D470,713 S | 2/2003 | Swinford et al. |
| 6,736,051 B2 * | 5/2004 | Frantz et al. .................. 99/349 |
| D490,644 S | 6/2004 | Groll |
| D507,147 S | 7/2005 | Land |

FOREIGN PATENT DOCUMENTS

| | | |
|---|---|---|
| WO | WO 9811783 A1 | 3/1998 |

* cited by examiner

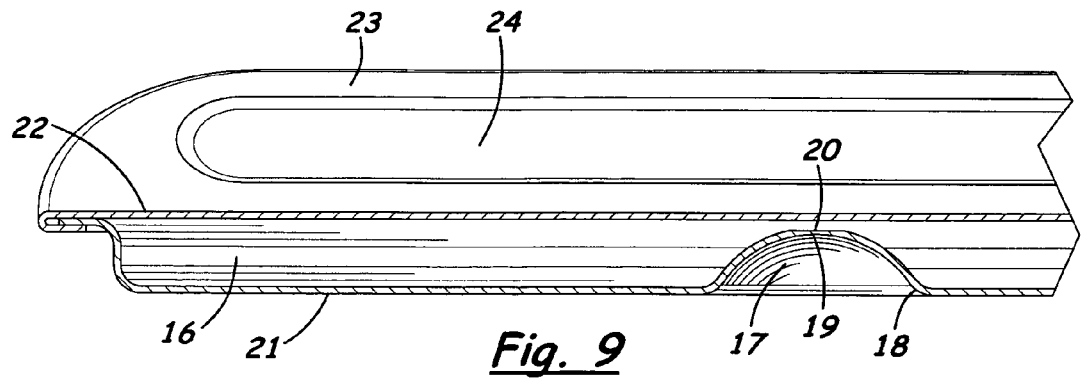
Fig. 9
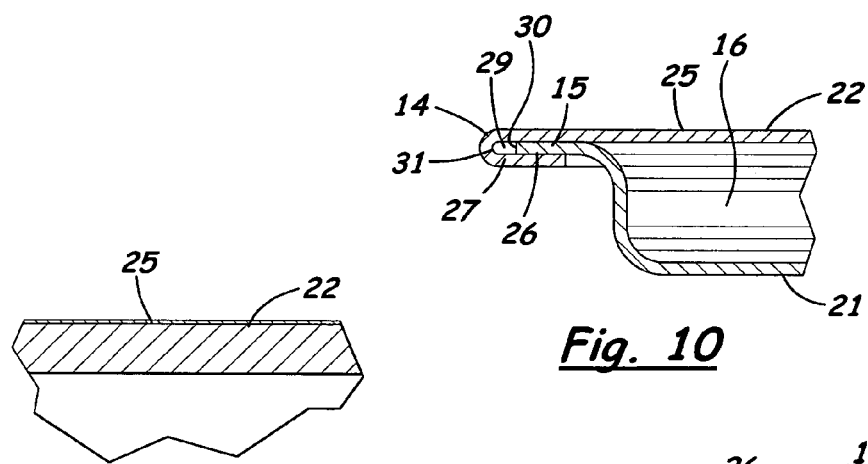
Fig. 10
Fig. 12
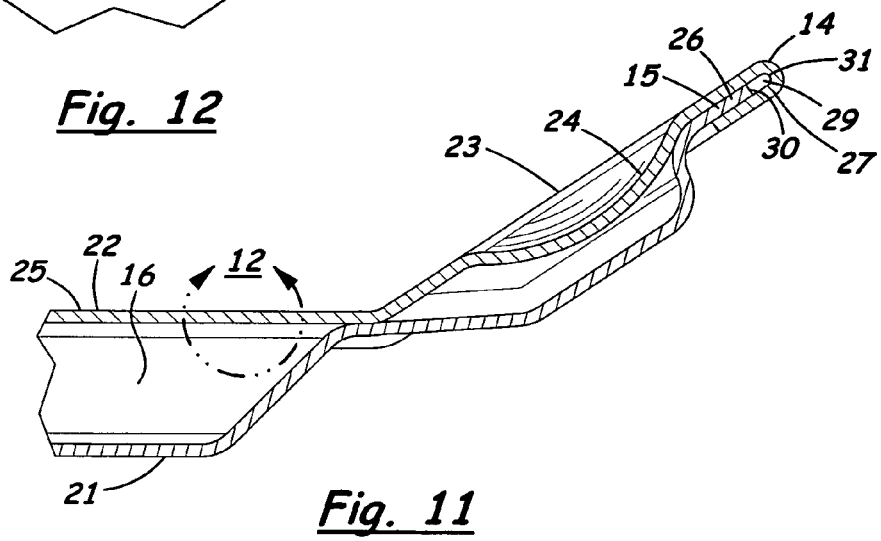
Fig. 11

INSULATED COOKING UTENSIL

BACKGROUND OF THE INVENTION

1. Field of the Invention

The present invention relates generally to improvements in cookware. In particular, the present invention relates to insulated cookware for reducing inadvertent overcooking of food.

2. Description of the Related Art

Cooking time is often quite critical when preparing foods, and overcooking may be very detrimental to the final quality of the cooked food. This problem is particularly prevalent in the baking of foods in an oven, or the like, wherein overbaking may substantially ruin the food. For example, cookies will burn relatively quickly if permitted to stay in the oven longer than the prescribed time, although they may also be underdone if removed from the oven prematurely. In addition, there is often a wide variation in the way different ovens cook because some ovens are apparently "hotter" than other ovens, even though the temperature controls are at the same temperature setting. As a result, there is sometimes very little tolerance in the baking time for many foods.

Insulated cooking utensils, such as cookie sheets and cake pans, have been developed in the past to alleviate or at least reduce the critical baking time during common baking procedures. Such insulated cooking utensils are typically constructed of upper and lower sheets of planar material secured together at their outer peripheries with an insulating air chamber formed between the sheets. These insulated cooking utensils have become very popular and widely available in the marketplace. Examples of these prior art insulated cooking utensils are described in U.S. Pat. Nos. 4,489,852 and 4,595,120.

The insulated cooking utensils described above are typically made of aluminum sheet material, which is normally manufactured to have a dull satin sheen on both sides. However, the cooking utensils can also be made of stainless steel or coated carbon steel sheet material. In one commercial embodiment, an insulated cooking utensil having the above-described construction was formed of aluminum material with a gold anodized coating on the cooking surface. These various materials of construction and surface finishes have provided different cooking performance characteristics for the insulated cooking ware. However, there remains a need in the industry for improvements in the construction and surface finish characteristics of insulated cooking ware.

SUMMARY OF THE INVENTION

An object of the present invention is to provide an improved insulated cooking utensil that overcome the problems and shortcomings of the prior art described above.

Further objects of the present invention are to provide an improved insulated cooking utensil that has improved cooking characteristics, that does not tend to show fingerprints or scratches, that has a long useful life, that is easy to grip and safe to handle, that has an attractive appearance and tighter seal at the outer periphery, that does not tend to become distorted from expansion during cooking, that has a greater perceived value due from a thicker air space and stiffer, more solid feel, and that has larger detents with flat peaks for easier cleaning and less deforming of the top sheet during use.

An insulated cooking utensil according to the present invention has upper and lower substantially planar sheet members disposed in substantially parallel relationship with each other and secured together at their outer peripheries. An air chamber is interposed between the upper and lower sheet members for insulating the upper sheet member from direct heat during a cooking operation. Spaced detents are provided in the lower sheet member to support and maintain the upper and lower sheet members in a spaced relationship with the air chamber interposed therebetween.

The sheet members are made of aluminum and the cooking surface on an upper side of the upper sheet member is covered by a clear anodized coating. An angular disposed flange extends along one side of the cooking utensil and has an elongated thumbgrip detent formed in its upper surface to facilitate gripping and handling the cooking utensil. An expansion space is provided between the outer edges of the sheet members to accommodate a relatively greater expansion of the lower sheet member relative to the upper sheet member during cooking operations to eliminate distortion.

The detents provided in the lower sheet member each have a dome-shaped configuration with a base and a peak and a flat spot at the peak on a side facing the upper sheet member to prevent deforming the upper sheet member locally where the detents contact the upper sheet member during use. The dimensions of the detents and the overall thickness of the cooking utensil are larger than the prior art for improved performance and easier cleaning.

According to a broad aspect of the present invention, an insulated cooking utensil is provided, comprising: upper and lower substantially planar sheet members disposed in substantially parallel relationship with each other and secured together; an air chamber interposed between the upper and lower sheet members for insulating the upper sheet member from direct heat during a cooking operation; and a plurality of spaced detents provided in the lower sheet member to support and maintain the upper and lower sheet members in a spaced relationship with the air chamber interposed therebetween. The insulated cooking utensil is characterized by the upper sheet member being made of aluminum, and a cooking surface on an upper side thereof being covered by a clear anodized coating.

According to another broad aspect of the invention, the cooking utensil is characterized by the detents each having a dome-shaped configuration with a base and a peak and a flat spot at the peak on a side facing the upper sheet member, whereby the flat spots on the detents prevent deforming the upper sheet member locally where the detents contact the upper sheet member during use.

According to another broad aspect of the invention, the cooking utensil is characterized by the detents each having a dome-shaped configuration with a base and a peak, the base having a diameter greater than about 0.75 inch, and each detent having a depth at the peak greater than about 0.20 inch.

Numerous other objects and features of the present invention will be apparent to those skilled in this art from the following description wherein there is shown and described an embodiment of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 9 is a section view of the cooking utensil taken along line 9-9 in FIG. 8.

FIG. 10 is a section view of the cooking utensil taken along line 10-10 in FIG. 8.

FIG. 11 is a section view of the cooking utensil taken along line 11-11 in FIG. 8.

FIG. 12 is a detail section view of the upper sheet member of the cooking utensil taken along line 12-12 in FIG. 11.

DETAILED DESCRIPTION OF THE PREFERRED EMBODIMENT

Figure 1:
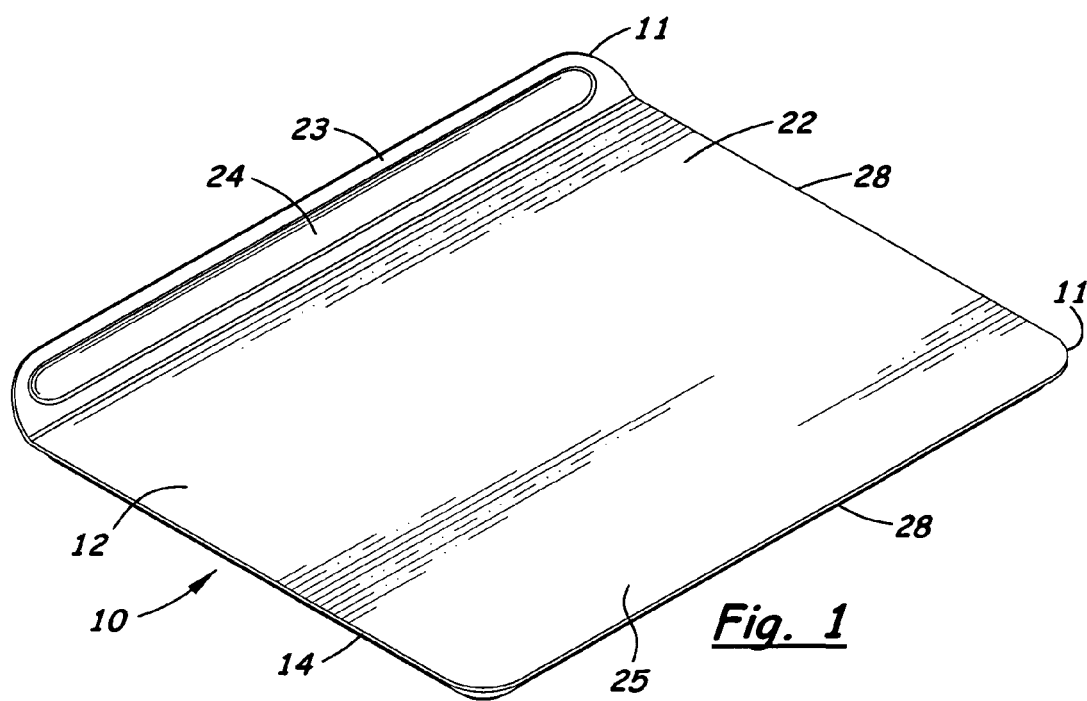
FIG. 1 is a perspective view of an insulated cooking utensil according to the present invention.
Figure 2:
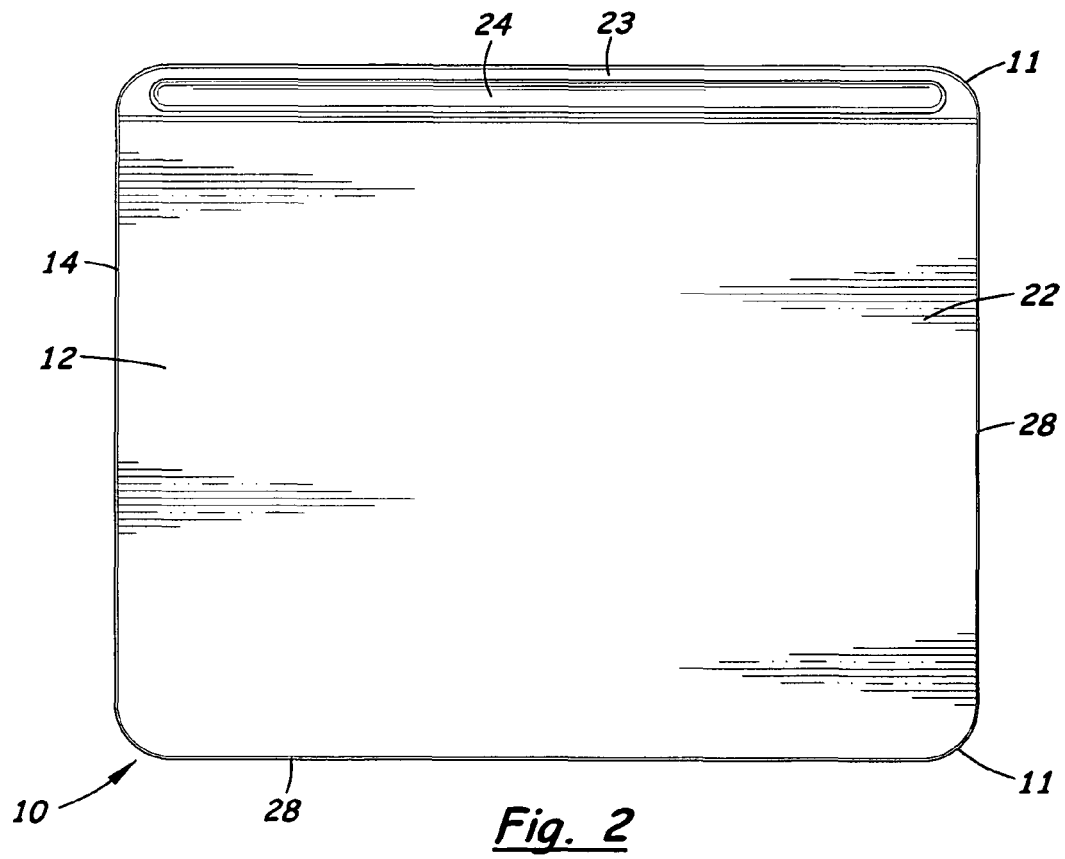
FIG. 2 is a plan view of the cooking utensil shown in FIG. 1.
Figure 3:
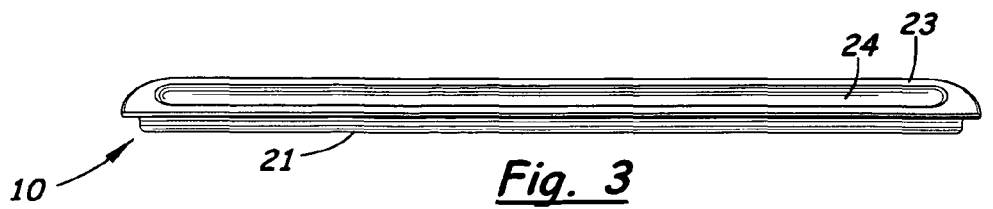
FIG. 3 is a front view of the cooking utensil shown in FIG. 1.
Figure 4:
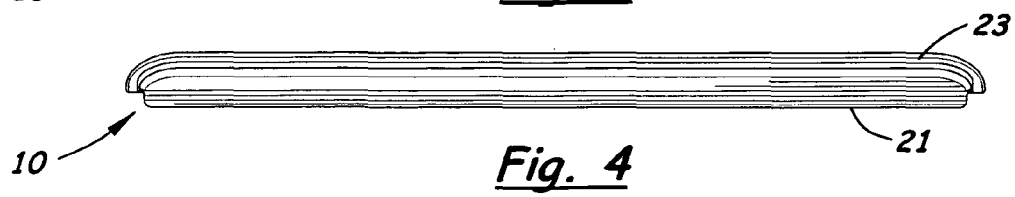
FIG. 4 is a rear view of the cooking utensil shown in FIG. 1.
Figure 5:
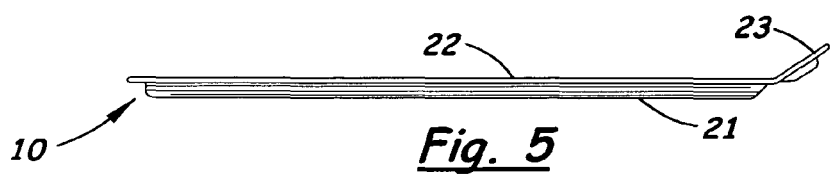
FIG. 5 is a right side view of the cooking utensil shown in FIG. 1.
Figure 6:
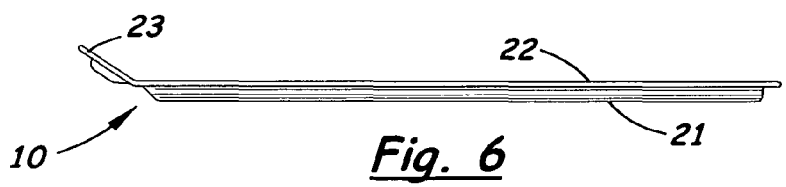
FIG. 6 is a left side view of the cooking utensil shown in FIG. 1.
Figure 7:
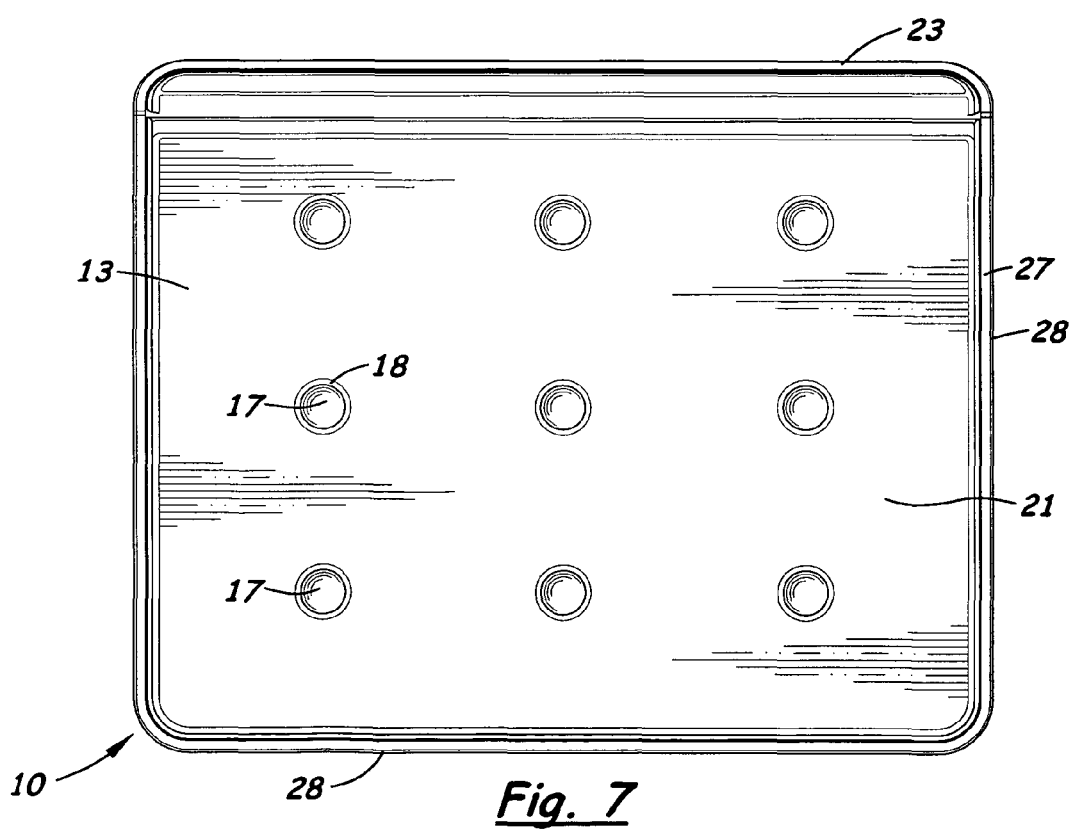
FIG. 7 is a bottom view of the cooking utensil shown in FIG. 1.
Figure 8:
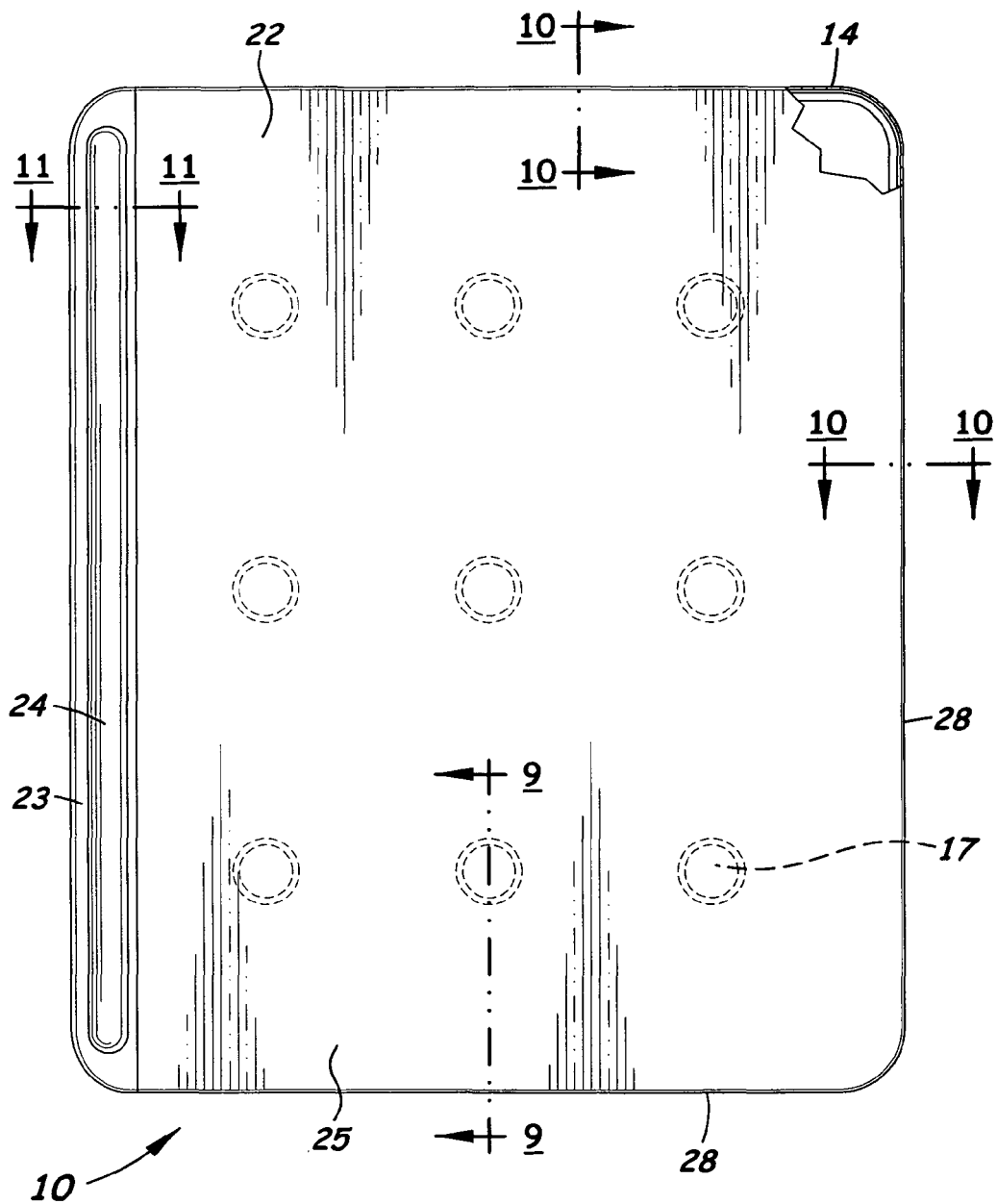
FIG. 8 is a plan view with a cutaway view of one of the corners of the cooking utensil.

An insulated cooking utensil 10, such as a cookie sheet, according to the present invention will now be described in detail with reference to FIGS. 1 to 12 of the accompanying drawings.

The insulated cooking utensil 10 shown in FIGS. 1 to 12 is in the form of a cookie sheet having a substantially rectangular planar configuration with four rounded corners 11. However, it will be understood by persons skilled in the art that some of the basic features of the present invention can be applied to other insulated cooking utensils, such as bread pans and cake pans. The cooking utensil 10 has upper and lower substantially planar sheet members 12, 13 disposed in substantially parallel relationship with each other. The sheet members 12, 13 are secured together at their outer peripheries by crimping the outer edge 14 of the upper sheet member 12 around an outer edge 15 of the lower sheet member 13, as explained below in connection with FIGS. 9 to 11.

An air chamber 16 is interposed between the upper and lower sheet members 12, 13 for insulating the upper sheet member 12 from direct heat during a cooking operation. A plurality of spaced detents 17 are provided in the lower sheet member 13 to support and maintain the upper and lower sheet members 12, 13 in a spaced relationship with the air chamber 16 interposed therebetween. The detents 17 each have a dome-shaped configuration with a base 18 of each detent 17 having a diameter greater than about 0.75 inch, and preferably about 1.12 inch. The detents 17 each have a depth at their peak 19 of greater than about 0.20 inch, and preferably about 0.28 inch. The detents 17 are substantially larger than the detents in prior art insulated baking sheets, which were typically only about 0.47 inch diameter and 0.11 inch deep.

The larger diameter provides an increased area of stiffness around each detent 17, providing for an overall increase in the rigidity of the lower sheet member 13.

A flat spot 20 is provided at the peak 19 of each detent 17 on a side facing the upper sheet member 12. The flat spots 20 each have a diameter of approximately 0.10 inch or greater, and preferably about 0.13 inch. The detents 17 are formed in the lower sheet member 13 by pressing a dome-shaped die into the flat sheet material in a known manner. The flat spots 20 can be formed at the same time by placing a hard flat surface to engage the peak of the detents 17 at the end of the stroke of the die when the detents 17 are pressed into the flat sheet material. The flat spots 20 on the detents 17 function to prevent deforming the upper sheet member 12 locally where the detents 17 contact the upper sheet member 12 during use. In the illustrated embodiment, nine detents 17 are evenly spaced across a cookie sheet cooking utensil 10, which has been found to be a suitable number of detents 17 for a utensil 10 having cooking surface dimensions of approximately 13 inches by 16 inches. In the prior art, insulated baking sheets having similar cooking surface dimensions typically had detents that were smaller in size and greater in number (e.g., 13 to 20 detents). The relatively larger size and fewer quantity of the detents 17 in the present invention allow much easier cleaning and provide better performance. According to one aspect of the present invention, a cooking utensil 10 having a substantially rectangular planar configuration with a cooking surface area exceeding about 200 square inches (e.g., 13 inch×16 inch) is provided with no more than nine detents 17 formed in the lower sheet member 13.

A cooking portion of the cooking utensil 10 has an overall thickness from a bottom side 21 of the lower sheet member 13 to a top side 22 of the upper sheet member 12 of approximately 0.30 inch or greater, and preferably about 0.37 inch. This is a substantial increase compared to the overall thickness of the insulated baking sheets of the prior art (e.g., approximately 75% increase in the typical case of a 0.21 inch thickness being increased to 0.37 inch thickness). The greater thickness provides more insulating air space, as well as more torsional rigidity. The added air space will help control heat flow to the baked product. The perceived value of the cooking utensil 10 is also increased by providing a stiffer more solid feel and a more deeply formed lower sheet member 13.

An angular disposed flange 23 extends along one side of the cooking utensil 10 and is disposed at an angle extending outwardly and upwardly relative to the cooking surface 22 on the upper sheet member 12. The angular disposed flange 23 has an elongated thumbgrip detent 24 formed in its upper surface and a wider surface (e.g., approximately 1.28 inch) for gripping than the prior art. The angular disposed flange 23 is preferably formed integral with the upper and lower sheet members 12, 13. The elongated thumbgrip detent 24 and wider gripping surface of the flange 23 provide for easier gripping and safer holding or moving of the hot cooking utensil 10.

In one embodiment of the present invention, at least the upper sheet member 12, and preferably both the upper and lower sheet members 12, 13, are made of aluminum. The upper side 22 of the upper sheet member 12 has a clear anodized finish coating 25 over the cooking surface, as depicted in FIG. 12. The clear anodized finish coating 25 can be formed by well known sulfuric acid anodizing processes. For practical purposes, both the upper and lower sides of the upper sheet member 12 may be anodized as the aluminum material is dipped into an anodizing solution.

The aluminum material having a clear anodized finish 25 provides a different rate of temperature rise and better performance compared to the materials of the prior art insulated cooking utensils 10, which have typically been formed of aluminum, stainless steel, or coated carbon steel. The aluminum material having a clear anodized surface finish 25 also provides a different rate of temperature rise compared to the prior art aluminum materials having a gold anodized finish. Specifically, testing by thermocouple measured the performance characteristics of both the clear anodized surface finish 25 of the present invention and the gold anodized surface finish of the prior art and showed the clear anodized surface finish 25 to have a slower rate of temperature rise. This slower temperature rise can cause a detectable difference in baked products that are sensitive to time and temperature cooking variables.

There are additional advantages of the aluminum material having a clear anodized aluminum cooking surface finish 25 as compared to the prior art gold anodized surface finish. Fingerprints are highly visible on the prior art gold colored surface, while finger prints on the clear anodized surface finish 25 are barely visible. While anodized surfaces are relatively hard, they are also thin, typically less than 0.001 inch. With the prior art gold colored surface, knife cuts, deep scratches and normal wear can show the bright basic aluminum base in contrast to the gold color. In contrast, the clear anodized surface finish 25 shows these areas in much less visible contrast, thereby adding value by increasing the useful life.

As shown in FIGS. 9 to 11, the upper and lower sheet members 12, 13 are secured together at their outer peripheries by folding the outer edge 14 of the upper sheet member 12 around the outer edge 15 of the lower sheet member 13. Specifically, the lower sheet member 13 has an outwardly extending planar flange 26 provided around its outer periphery, and the upper sheet member 12 has a flange 27 provided at its outer periphery that is folded around the flange 26 of the lower sheet member 13 to provide a permanent securing engagement between the upper and lower sheet members 12, 13. The folded-under flange 27 of the upper sheet member 12 is continuous along each of the sides 28 of the cooking utensil 10 and around the rounded corners 11.

The lower sheet member 13, which is exposed to direct heat from the lower oven element during cooking, will expand more than the upper sheet member 12, which is protected by the lower sheet member 13 and the air chamber 16 in between the two sheet members 12, 13. In the prior art, the insulated cooking utensils, and particularly insulated cookie sheets, tended to distort after some use because of a lack of sufficient expansion space between the upper and lower sheet members. To accommodate the relatively greater expansion of the lower sheet member 13 relative to the upper sheet member 12 during cooking operations, an expansion space 29 is provided around the outer edge 30 of the planar flange 26 of the lower sheet member 13. The expansion space 29, measured between the outer edge 30 of the planar flange 26 of the lower sheet member 13 and the facing inner edge 31 of the folded-under flange 27 of the upper sheet member 12, is greater than approximately 0.050 inch per side, and preferably about 0.062 inch per side. This greater expansion space 29 (approximately 0.032 inch more space per side than the prior art) provides a solution to the distortion problem of the prior art.

According to another aspect of the present invention, the upper sheet member 12 has a material thickness greater than the typical thickness of the prior art sheet members. Specifically, the prior art sheet members have a thickness of approximately 0.032 inch or less, while the upper sheet member 12 of the present invention in one preferred embodiment is formed from an aluminum sheet having a material thickness of 0.040 inch to 0.050 inch. This increase in material thickness provides a substantial increase in the strength of the cooking utensil 10 and reduces the possibility of causing impressions in the upper sheet member 12 from the detents 17 when heavy objects are placed on the cooking utensil 10.

While the invention has been specifically described in connection with specific embodiments thereof, it is to be understood that this is by way of illustration and not of limitation, and the scope of the appended claims should be construed as broadly as the prior art will permit.

What is claimed is:

1. An insulated cooking utensil, comprising:
   upper and lower substantially planar sheet members disposed in substantially parallel relationship with each other and secured together;
   an air chamber interposed between the upper and lower sheet members for insulating the upper sheet member from direct heat during a cooking operation; and
   a plurality of spaced detents provided in the lower sheet member to support and maintain the upper and lower sheet members in a spaced relationship with the air chamber interposed therebetween;
   said upper sheet member being made of aluminum and having a cooking surface on an upper side thereof covered by a clear anodized coating; and
   further comprising an angular disposed flange extending along one side of the cooking utensil and disposed at an angle extending outwardly and upwardly relative to the cooking surface, said angular disposed flange having an elongated thumbgrip detent formed in its upper surface to facilitate gripping and handling the cooking utensil between a user's thumb and fingers.

2. The insulated cooking utensil according to claim 1, wherein said angular disposed flange is formed integral with the upper and lower sheet members.

3. The insulated cooking utensil according to claim 1, wherein said upper and lower sheet members are secured together by an outwardly extending planar flange provided around an outer periphery of the lower sheet member and a folded-under flange provided around an outer periphery of the upper sheet member, said folded-under flange being folded around said planar flange to provide a permanent securing engagement between the upper and lower sheet members.

4. The insulated cooking utensil according to claim 3, wherein an expansion space of approximately 0.050 inch or greater per side is provided between an outer edge of the planar flange of the lower sheet member and a facing inner edge of the folded-under flange of the upper sheet member, to thereby accommodate a relatively greater expansion of the lower sheet member relative to the upper sheet member during cooking operations.

5. The insulated cooking utensil according to claim 4, wherein said cooking utensil has a substantially rectangular planar configuration with four sides and rounded corners, and said folded-under flange of said upper sheet member is continuous along the sides of the rectangular planar configuration and around the rounded corners.

6. The insulated cooking utensil according to claim 1, wherein said detents each have a dome-shaped configuration with a base and a peak and a flat spot at the peak on a side facing the upper sheet member, whereby said flat spot on each detent prevents deforming the upper sheet member locally where the detents contact the upper sheet member during use.

7. The insulated cooking utensil according to claim 6, wherein the base of each detent has a diameter greater than about 0.75 inch, each detent has a depth at said peak greater than about 0.20 inch, and a cooking portion of said cooking utensil has an overall thickness from a bottom side of the lower sheet member to a top side of the upper sheet member of approximately 0.30 inch or greater.

8. The insulated cooking utensil according to claim 6, wherein the base of each detent has a diameter of approximately 1.12 inch, each detent has a depth at its peak of approximately 0.28 inch, and a cooking portion of said cooking utensil has an overall thickness from a bottom side of the lower sheet member to a top side of the upper sheet member of approximately 0.37 inch.

* * * * *